US012100101B2

(12) United States Patent
Min et al.

(10) Patent No.: US 12,100,101 B2
(45) Date of Patent: Sep. 24, 2024

(54) GENERATING 2D MAPPING USING 3D DATA

(71) Applicant: International Business Machines Corporation, Armonk, NY (US)

(72) Inventors: Xu Min, Beijing (CN); Dan Zhang, Beijing (CN); Xue Ping Liu, Beijing (CN); Yuan Yuan Ding, Shanghai (CN); Hong Bing Zhang, Beijing (CN); Chao Xin, Ningbo (CN); Fan Li, Xianyang (CN)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 17/409,918

(22) Filed: Aug. 24, 2021

(65) Prior Publication Data

US 2023/0062313 A1   Mar. 2, 2023

(51) Int. Cl.
*G06T 17/05*  (2011.01)
*G06F 18/214*  (2023.01)
(Continued)

(52) U.S. Cl.
CPC .......... *G06T 17/05* (2013.01); *G06F 18/2148* (2023.01); *G06T 3/06* (2024.01);
(Continued)

(58) Field of Classification Search
None
See application file for complete search history.

(56) References Cited

U.S. PATENT DOCUMENTS 8,224,097 B2   7/2012 Matei
8,705,893 B1   4/2014 Zhang
(Continued)

OTHER PUBLICATIONS

Zhang Y, Yang W, Liu X, Wan Y, Zhu X, Tan Y. Unsupervised building instance segmentation of airborne LiDAR point clouds for parallel reconstruction analysis. Remote Sensing. Mar. 17, 2021;13(6):1136. (Year: 2021).*

(Continued)

*Primary Examiner* — Emily C Terrell
*Assistant Examiner* — Nathan J Bloom
(74) *Attorney, Agent, or Firm* — Edward Wixted; Andrew D. Wright; Calderon Safran & Wright P.C.

(57) ABSTRACT

In an aspect for generating a 2-dimensional (2D) building mapping, a computer-implemented method may include one or more processors configured for receiving scanning data in a first file format corresponding to 3-dimensional (3D) aerial Light Detection and Ranging (LiDaR) images. Further, the method may include transforming the first file format to a second file format and transmitting the scanning data to a building semantic segmentation component. Further, the computer-implemented method may include generating semantic segmentation data corresponding to building structures defined by point clusters; generating instance segmentation data corresponding to top surfaces of the building structures; generating building boundary data for each one of the point clusters based on one or more of the semantic segmentation data and the instance segmentation data; and processing the building boundary data to generate a 2D building mapping comprising refined boundary lines for each of the point clusters.

17 Claims, 9 Drawing Sheets

(51) Int. Cl.
*G06T 3/06* (2024.01)
*G06T 7/11* (2017.01)
*G06T 17/00* (2006.01)
*G06V 10/26* (2022.01)
*G06V 10/762* (2022.01)
*G06V 20/10* (2022.01)
*G06V 20/64* (2022.01)

(52) U.S. Cl.
CPC ............... *G06T 7/11* (2017.01); *G06T 17/00* (2013.01); *G06V 10/26* (2022.01); *G06V 10/762* (2022.01); *G06V 20/176* (2022.01); *G06V 20/64* (2022.01); *G06T 2200/08* (2013.01); *G06T 2207/10028* (2013.01); *G06T 2207/10032* (2013.01); *G06T 2207/20084* (2013.01); *G06T 2207/30184* (2013.01); *G06T 2210/56* (2013.01)

(56) References Cited

U.S. PATENT DOCUMENTS

| | | | |
|---|---|---|---|
| 9,189,862 | B2 | 11/2015 | Fu |
| 9,811,714 | B2 | 11/2017 | Fu |
| 10,572,970 | B2 | 2/2020 | Sturm |
| 11,580,328 | B1* | 2/2023 | Ho ................ G06V 10/774 |
| 2017/0124415 | A1* | 5/2017 | Choi ............... G06V 10/764 |
| 2017/0358087 | A1* | 12/2017 | Armeni .............. G06V 20/10 |
| 2020/0151512 | A1* | 5/2020 | Corral-Soto ........ G06F 18/251 |
| 2020/0364554 | A1* | 11/2020 | Wang .................. G06T 7/11 |
| 2021/0248390 | A1* | 8/2021 | Liang .................. G06N 3/08 |
| 2021/0350183 | A1* | 11/2021 | Liu ................... G06V 10/82 |
| 2022/0261593 | A1* | 8/2022 | Yu ..................... G06N 3/088 |
| 2023/0289974 | A1* | 9/2023 | Knuffman ............. G06N 3/08 382/154 |

OTHER PUBLICATIONS

Zhang F, Guan C, Fang J, Bai S, Yang R, Torr PH, Prisacariu V. Instance segmentation of lidar point clouds. In2020 IEEE International Conference on Robotics and Automation (ICRA) May 31, 2020 (pp. 9448-9455). IEEE. (Year: 2020).*

Dong S, Lin G, Hung TY. Learning regional purity for instance segmentation on 3d point clouds. InEuropean Conference on Computer Vision Oct. 23, 2022 (pp. 56-72). Cham: Springer Nature Switzerland. (Year: 2022).*

He T, Liu Y, Shen C, Wang X, Sun C. Instance-aware embedding for point cloud instance segmentation. InComputer Vision—ECCV 2020: 16th European Conference, Glasgow, UK, Aug. 23-28, 2020, Proceedings, Part XXX 16 2020 (pp. 255-270). Springer International Publishing. (Year: 2020).*

Wang X, Liu S, Shen X, Shen C, Jia J. Associatively segmenting instances and semantics in point clouds. Proceedings of the IEEE/CVF Conference on Computer Vision and Pattern Recognition Feb. 2019 (pp. 4096-4105). (Year: 2019).*

Klokov R, Lempitsky V. Escape from cells: Deep kd-networks for the recognition of 3d point cloud models. Proceedings of the IEEE international conference on computer vision Apr. 2017 (pp. 863-872). (Year: 2017).*

Hafiz AM, Bhat GM. A survey on instance segmentation: state of the art. International journal of multimedia information retrieval. Sep. 2020;9(3):171-89. (Year: 2020).*

Xia S, Chen D, Wang R, Li J, Zhang X. Geometric primitives in LiDAR point clouds: A review. IEEE Journal of Selected Topics in Applied Earth Observations and Remote Sensing. Jan. 31, 2020;13:685-707. (Year: 2020).*

Gankhuyag et al., "Automatic 2D Floorplan CAD Generation from 3D Point Clouds", MDPI, Applied Sciences, 2020, 10, 2817, doi: 10.3390/app10082817, Published: Apr. 19, 2020, 12 pages.

Leotta et al., "Urban Semantic 3D Reconstruction from Multiview Satellite Imagery", Conference Paper, Jun. 2019, DOI: 10.1109/CVPRW.2019.00186, 11 pages.

Li et al., "Instance Segmentation of Buildings Using Keypoints", arXiv:2006.03858v1 [cs.CV] Jun. 6, 2020, 4 pages.

Okorn et al., "Toward Automated Modeling of Floor Plans", Published 2010, 11 pages.

Stojanovic et al., "Generation of Approximate 2D and 3D Floor Plans from 3D Point Clouds", Conference Paper, Dec. 2018, DOI: 10.5220/0007247601770184, 9 pages.

* cited by examiner

GENERATING 2D MAPPING USING 3D DATA

BACKGROUND

The present invention relates generally to the field of image data mapping, and more particularly to generating 2-dimensional (2D) building mapping using 3-dimensional (3D) aerial Light Detection and Ranging (LiDaR) scanning data.

In mapping areas of the earth, drones are often used to take multiple aerial photographs (e.g., 3D aerial LiDaR scanning data) of the same plot from different angles. Then, a manual 3D reconstruction process is performed to reconstruct a high precision 3D model (e.g., 3D scanning data) of this plot. After obtaining this 3D scanning data, a 2D building mapping is generated using Computer Aided Design (CAD) software without the need of a site survey. However, the CAD software is still labor-consuming and is not an AI-enabled process currently. Various methods are employed to convert the 3D data into a 2D building mapping. A traditional method is in the earth mapping field, where buildings are manually labeled using CAD software. However, this traditional method has a major disadvantage because it is very time consuming and labor intensive.

SUMMARY

The present invention is described in various embodiments disclosing methods, computer program products, and computer systems for generating a 2-dimensional (2D) building mapping. One embodiment of the present disclosure may include one or more processors configured for transmitting scanning data in a second file format to a building semantic segmentation component; generating semantic segmentation data corresponding to one or more building structures defined by one or more point clusters; generating instance segmentation data corresponding to one or more top surfaces of the one or more building structures; generating building boundary data for each one of the one or more point clusters based on one or more of the semantic segmentation data and the instance segmentation data; and processing the building boundary data to generate a 2D building mapping comprising refined boundary lines for each of the one or more point clusters.

In some aspects of an embodiment of the present invention, one or more processors may be configured for, prior to the transmitting the scanning data, receiving the scanning data corresponding to 3-dimensional (3D) aerial Light Detection and Ranging (LiDaR) images, wherein the scanning data is in a first file format; and transforming the scanning data from the first file format to the second file format.

In some aspects of an embodiment of the present invention, generating semantic segmentation data may further include processing the scanning data in the second file format using a deep learning (DL) model to generate building structure data identifying the one or more building structures based at least on the one or more point clusters.

In some aspects of an embodiment of the present invention, generating instance segmentation data may further include processing one or more of the scanning data and the semantic segmentation data using a rooftop detection component to generate top surface data identifying the one or more top surfaces of the one or more building structures.

In some aspects of an embodiment of the present invention, one or more processors may be configured for identifying one or more individual buildings based on the building structure data and the top surface data.

In some aspects of an embodiment of the present invention, one or more processors may be configured for filtering one or more noise point clusters from the one or more point clusters, the one or more noise point clusters satisfying a first condition.

In some aspects of an embodiment of the present invention, generating the building boundary data may further include discriminating wall data represented in the semantic segmentation data and roof data represented in the instance segmentation data; separately projecting the wall data and the roof data into a 2D space of the 2D building mapping; and generating a convex polygon based on the wall data and the roof data in the 2D space.

DETAILED DESCRIPTION

The present invention addresses the technical problem of automatically and seamlessly mapping 3-dimensional (3D) image data to a 2-dimensional (2D) computer-aided workspace. A solution is provided to automatically convert the 3D aerial LiDAR scanning data into a 2D building mapping using an Artificial Intelligence (AI) based process.

Embodiments of the present invention address this technical problem using a novel pipeline approach for automatically and seamlessly mapping 3D image data to a 2D computer-aided workspace, wherein the novel pipeline approach includes at least two components.

In an embodiment, the first component is a building segmentation component, which may be configured to use a deep learning (DL) model to find all buildings represented in the 3D image data, and then is configured to perform a rooftop detection process to identify and/or locate individual buildings. In an embodiment, the building segmentation component may include a building semantic segmentation component and a building instance segmentation component.

In an embodiment, the second component is a building boundary computation component that is configured to determine the difference between walls and roofs, and projects the walls and roofs into a 2D space separately and computes the convex polygon. Even further, the building boundary computation component is configured to execute an algorithm for building boundary generation and a post-process component for the generated boundary.

The present invention will now be described in detail with reference to the Figures.

Figure 1:
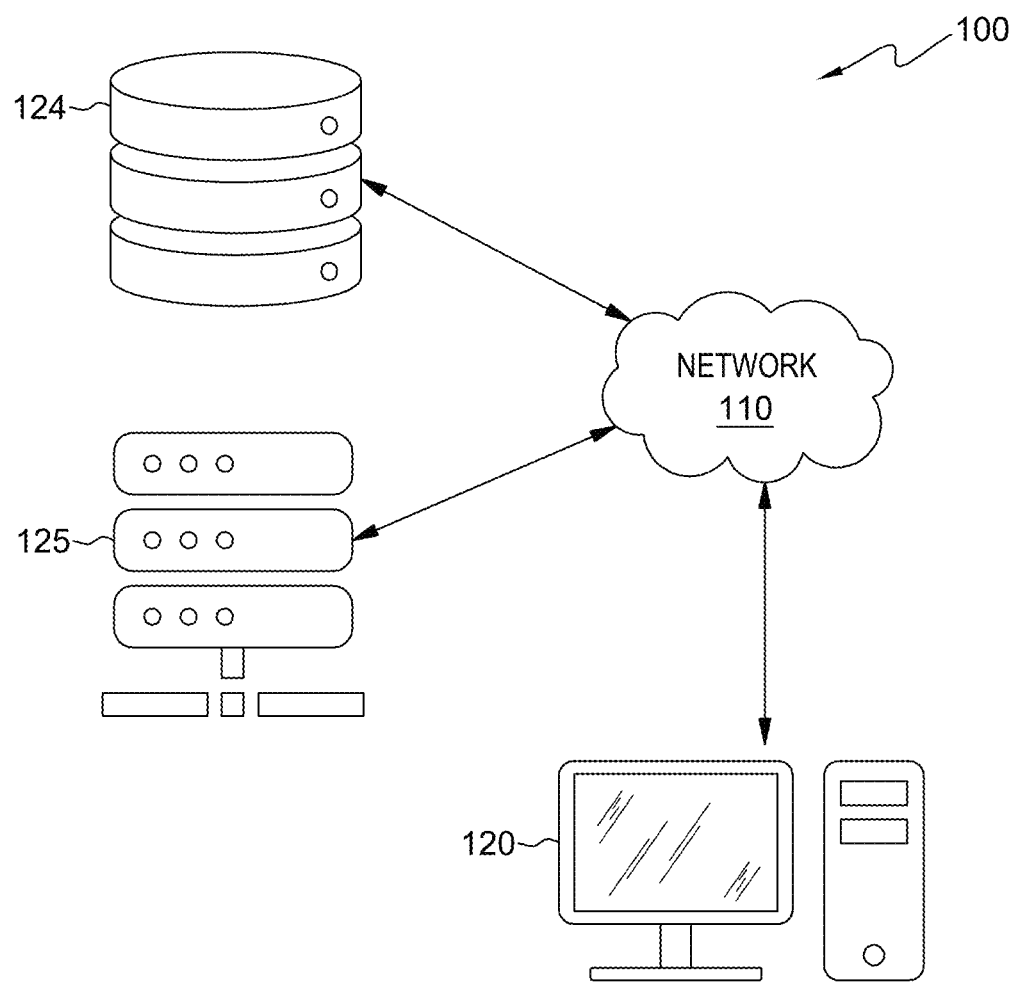
FIG. 1 depicts a block diagram of a distributed data processing environment for generating a 2-dimensional (2D) building mapping, in accordance with an embodiment of the present invention.

FIG. 1 depicts a block diagram of a distributed data processing environment 100 for generating a 2D building mapping, in accordance with an embodiment of the present invention. FIG. 1 provides only an illustration of one embodiment of the present invention and does not imply any limitations with regard to the environments in which different embodiments may be implemented. In the depicted embodiment, environment 100 includes computing device 120, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120, server 125, and database 124. Environment 100 may also include additional servers, computers, sensors, or other devices not shown.

Computing device 120 operates to execute at least a part of a computer program for generating a 2D building mapping. Computing device 120 may be configured to send and/or receive data from network 110 or from any other device connected to network 110. In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database 124, server 125 via network 110. Computing device 120 may include components as described in further detail in FIG. 9.

Computing device 120 may also be configured to receive, store, and process images exchanged between network 110, database 124, and server 125. Computing device 120 may be configured to store image data in memory of computing device 120 or transmit the image data to database 124 or server 125 via network 110. The image data may be processed by one or more processors in communication with computing device 120 or by one or more processors associated with server 125 in a cloud computing network.

Database 124 operates as a repository for data flowing to and from network 110. Examples of data include image data, 3D LiDaR image data, network data, and data corresponding to images processed within environment 100. A database is an organized collection of data. Database 124 can be implemented with any type of storage device capable of storing data and configuration files that can be accessed and utilized by computing device 120, such as a database server, a hard disk drive, or a flash memory. In an embodiment, database 124 is accessed by computing device 120 to store data corresponding to images processed within environment 100. In another embodiment, database 124 is accessed by computing device 120 to access user data, device data, network data, and data corresponding to images processed within environment 100. In another embodiment, database 124 may reside elsewhere within environment 100 provided database 124 has access to network 110.

Server 125 can be a standalone computing device, a management server, a web server, or any other electronic device or computing system capable of receiving, sending, and processing data and capable of communicating with computing device 120 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within environment 100. Server 125 may include components as described in further detail in FIG. 9.

Figure 2:
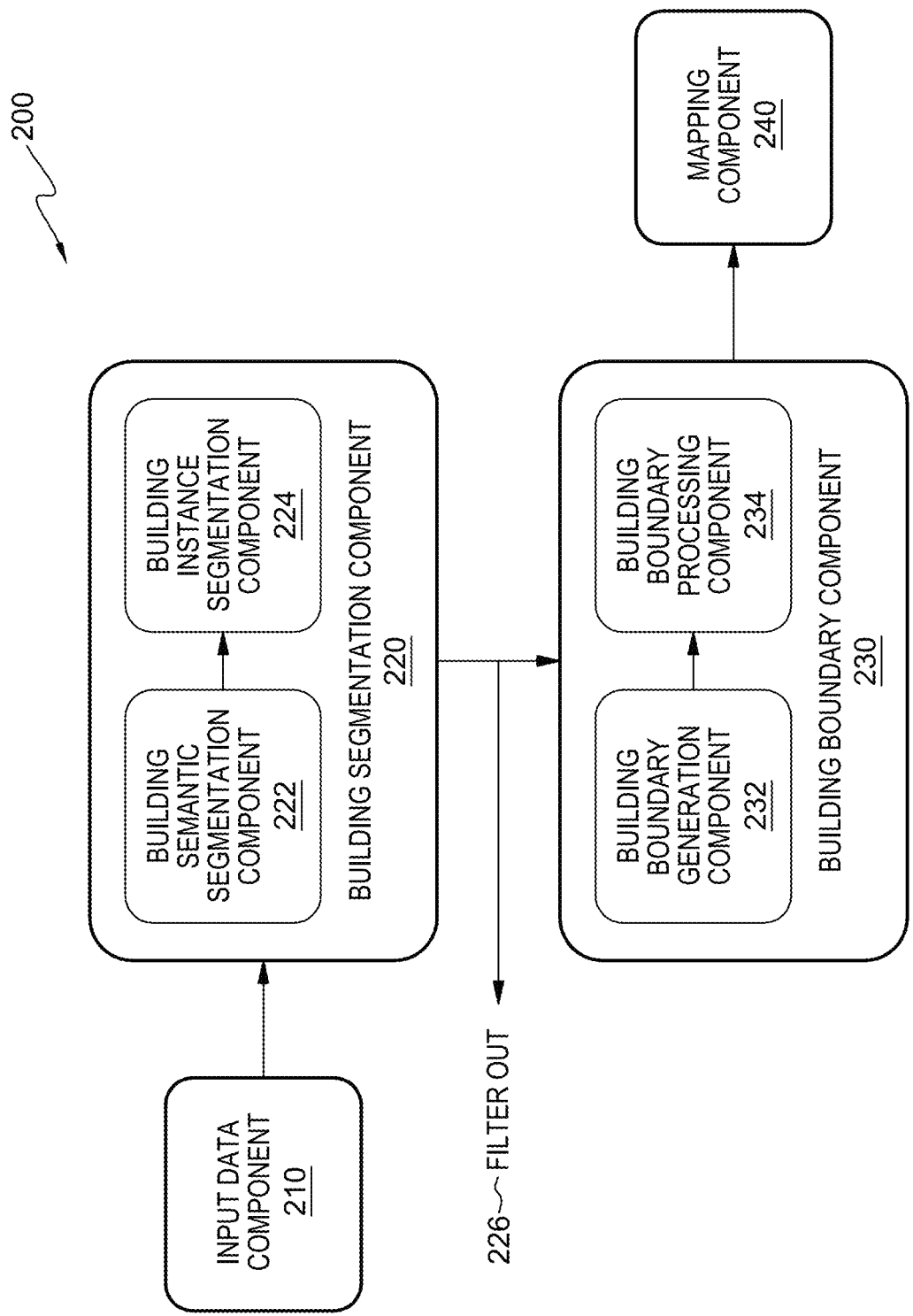
FIG. 2 depicts a block diagram of a model for generating a 2D building mapping, in accordance with an embodiment of the present invention.

FIG. 2 depicts a block diagram of a model 200 for generating a 2D building mapping, in accordance with an embodiment of the present invention.

While the foregoing describes, and FIG. 2 illustrates, implementation of model 200, the present disclosure is not limited thereto. In at least some embodiments, model 200 may implement a trained component or trained model configured to perform the processes described above with respect to model 200. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 2 depicts a block diagram of model 200 for generating a 2D building mapping, in accordance with an embodiment of the present invention. Model 200 illustrates input data component 210 configured for receiving input data at particular stages, wherein the input data may include scanning data corresponding to 3D LiDaR images.

In an embodiment, model 200 may include input data component 210 configured for receiving the scanning data, which may be in a first file format corresponding to the native file format used for 3D aerial LiDaR images (e.g., .LAS). In an embodiment, input data component 210 may be configured for transforming scanning data from a first file format to a second file format and transmitting the scanning data in the second file format to other components in model 200 (e.g., building segmentation component 220). In an embodiment, the second file format may be a file format corresponding to the appropriate use case for further processing by another component of model 200, or as known by one of ordinary skill in the art.

In an embodiment, prior to the transmitting the scanning data, input data component 210 may be configured for receiving the scanning data corresponding to the 3D LiDaR images, wherein the scanning data is in a first file format and transforming the scanning data from the first file format to the second file format.

In an embodiment, model 200 may include building segmentation component 220 configured to receive input data (e.g., scanning data) from input data component 210 in one or more of a plurality of file formats. Building segmentation component 220 may be configured to receive multiple input images and produce model segmentation output data (e.g., semantic segmentation data, instance segmentation data) as feature vectors corresponding to each image and transmit the model segmentation output data to another component (e.g., building boundary component 230) of model 200 or to a series of fully connected layers of model 200. The output data from the fully connected layers may be representative of a classification for a full study. This model segmentation output data may be in the form of a confidence score or probability for each classification.

In an embodiment, building segmentation component 220 may include building semantic segmentation component 222 configured to generate semantic segmentation data corresponding to one or more building structures defined by one or more point clusters.

In an embodiment, generating semantic segmentation data may further include building segmentation component 220 further configured to process the scanning data in the second file format using a deep learning (DL) model to generate building structure data configured to identify the one or more building structures based at least on the one or more point clusters.

In an embodiment, building segmentation component 220 may include building instance segmentation component 224 configured to generate instance segmentation data corresponding to one or more top surfaces of the one or more building structures.

In an embodiment, generating instance segmentation data may further include building instance segmentation component 224 further configured to process one or more of the scanning data and the semantic segmentation data using a rooftop detection component to generate top surface data identifying the one or more top surfaces of the one or more building structures.

In an embodiment, building segmentation component 220 may further be configured to identify one or more individual buildings based on the building structure data and the top surface data.

In an embodiment, model 200 may include one or more processors configured to filter out 226 one or more noise point clusters from the one or more point clusters, wherein the one or more noise point clusters are filtered out 226 if they satisfy a first condition. For example, if the one or more point clusters include less than 100 points, then the less than 100 point clusters may be filtered out 226 from being further processed within model 200 network. The condition to be satisfied to identify noise point clusters may be any value ascertainable or predetermined by a designer of model 200.

In an embodiment, model 200 may include building boundary component 230 configured to receive model segmentation output data (e.g., semantic segmentation data, instance segmentation data) and process the model segmentation output data to generate building boundary data for each one of the one or more point clusters based on one or more of the semantic segmentation data and the instance segmentation data. For example, building boundary component 230 may include building boundary generation component 232 configured to receive model segmentation output data, and process model segmentation output data to filter out 226 wall points according to normal vectors, filter out 226 roof points and down-sample roof points, denoise 3D points and keep only 2D information (e.g., x, y points). Further, building boundary generation component 232 may be configured to find concave hull points using alpha shape, fit boundary points into segmented lines using a RANdom SAmple Consensus (RANSAC) algorithm, and to merge, regularize, and complete the lines.

In an embodiment, building boundary component 230 may include building boundary generation processing component 234 configured to deflate and inflate the completed lines as described above herein. For example, building boundary generation processing component 234 may be configured to receive data from building boundary generation component 232 corresponding to the completed lines and deflate the completed lines and inflate the deflated completed lines to generate building boundary data (e.g., model boundary output data) for further processing by another component (e.g., mapping component 240) in model 200.

In an embodiment, generating the building boundary data may further include building boundary component 230 configured to determine the differences between wall data represented in the semantic segmentation data and roof data represented in the instance segmentation data.

In an embodiment, model 200 may include mapping component 240 configured to receive building boundary data and process the building boundary data to generate a 2D building mapping that may include refined boundary lines for each of the one or more point clusters. For example, mapping component 240 may be configured to separately project the wall data and the roof data into a 2D space of the 2D building mapping and generating a convex polygon based on the wall data and the roof data in the 2D space.

In an embodiment, model output data may be transmitted to computing device 120 via network 110 for processing and display on a user interface of computing device 120.

Figure 3:
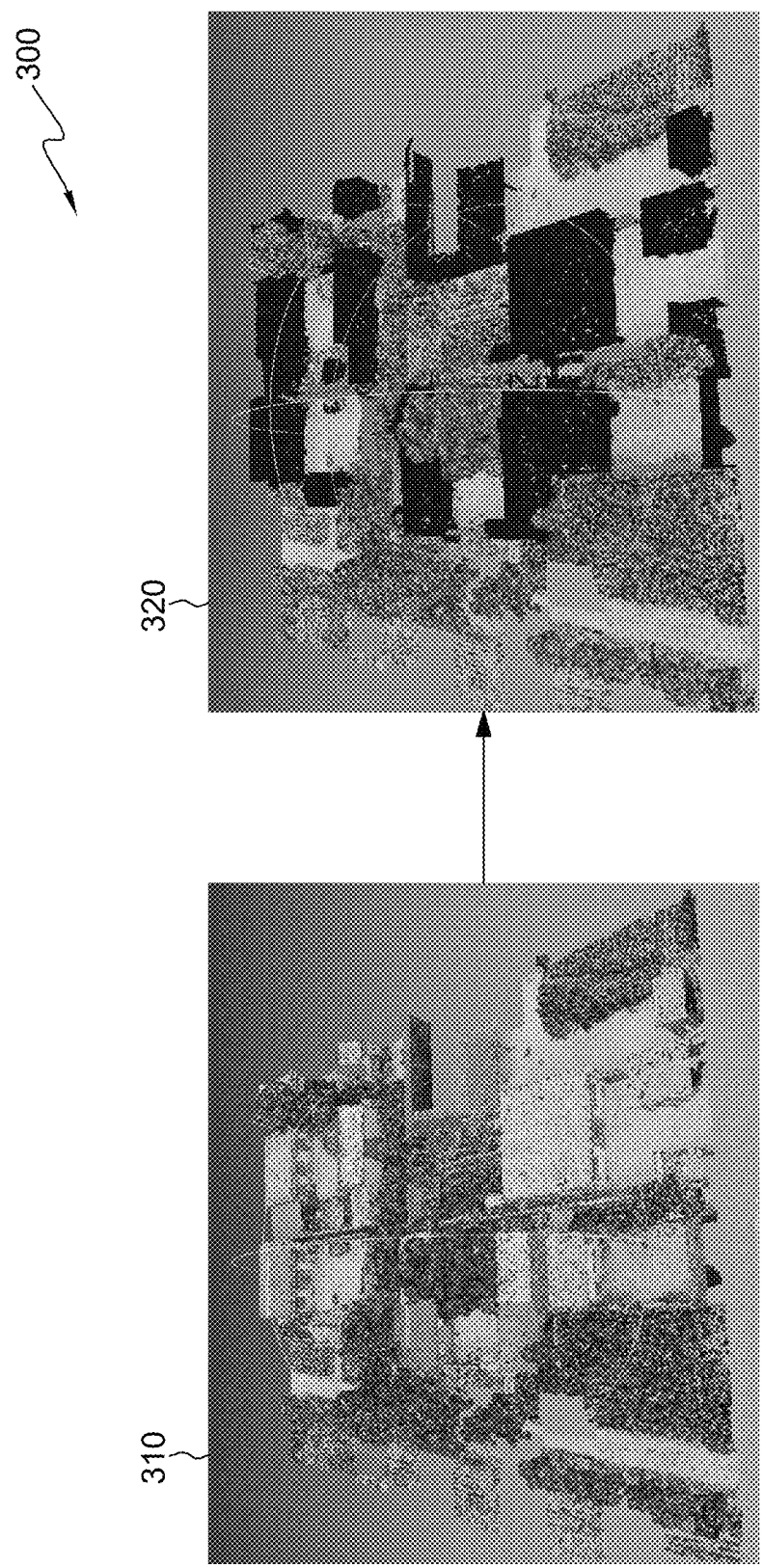
FIG. 3 depicts a block diagram of a semantic segmentation process for generating a 2D building mapping, in accordance with an embodiment of the present invention.

FIG. 3 depicts a block diagram illustrating a semantic segmentation process 300 (as performed by building semantic segmentation component 222) for generating a 2D building mapping, in accordance with an embodiment of the present invention.

In an embodiment, process 300 may include the one or more processors configured to receive scanning data corresponding to 3D point cloud images 310 comprising x, y, z position, red, green, blue (RGB), and a normal vector. In this embodiment, a preliminary segmentation result is achieved by segmenting the images represented in the scanning data to generate data corresponding to one or more building structures defined by one or more point clusters represented by building structure images 320. Therefore, the one or more building structures may be used to identify one or more buildings based at least on the one or more point clusters.

Figure 4:
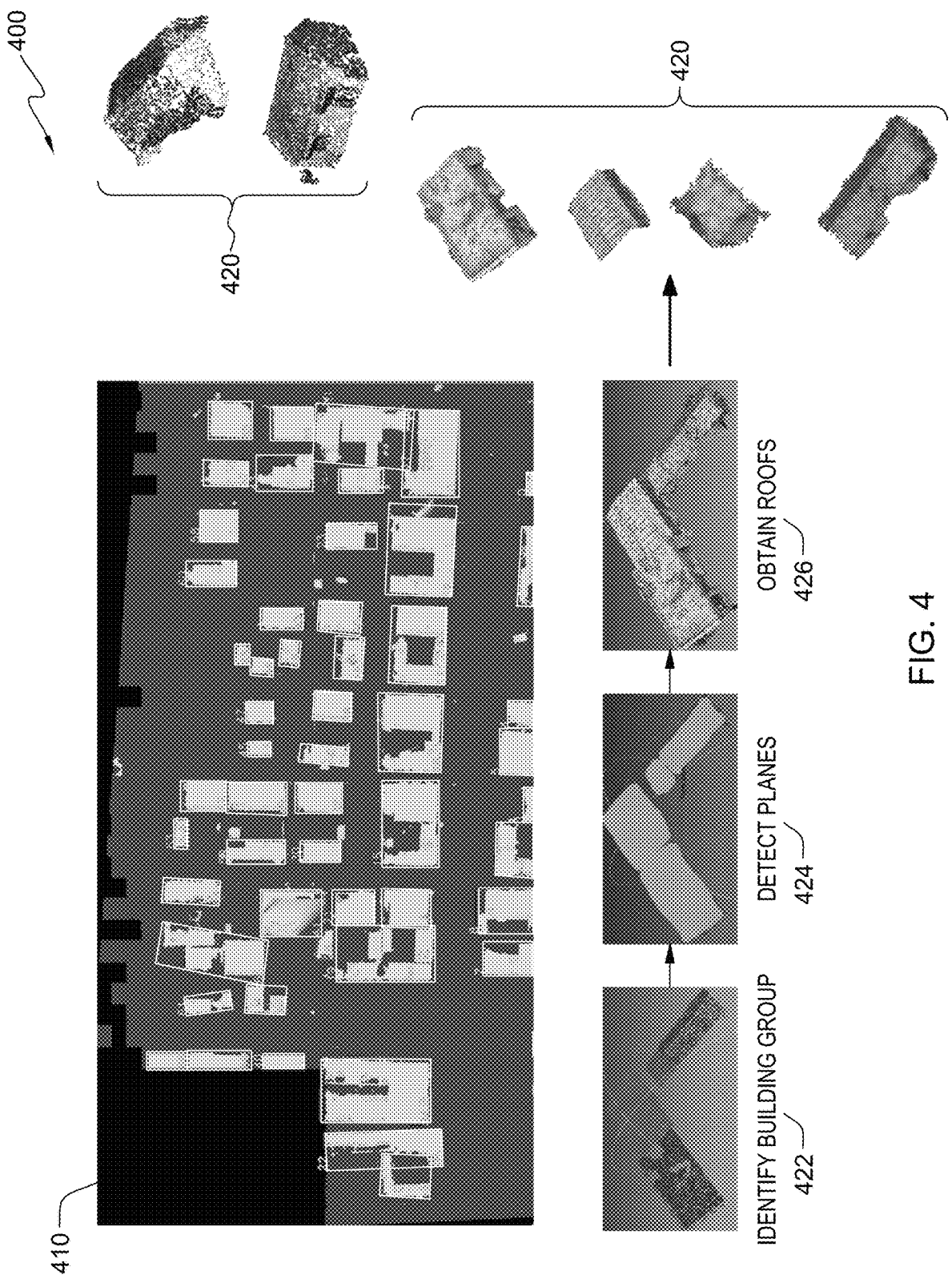
FIG. 4 depicts a block diagram of an instance segmentation process for generating a 2D building mapping, in accordance with an embodiment of the present invention.

FIG. 4 depicts a block diagram illustrating an instance segmentation process 400 (as performed by building instance segmentation component 224) for generating a 2D building mapping, in accordance with an embodiment of the present invention.

In an embodiment, process 400 may include one or more processors configured to receive model output data corresponding to outlined building structure images 410, wherein individual buildings 420 are segmented from all buildings in a map depicting outlined building structure images 410. For example, the one or more processors may be configured to segment the individual buildings 420 according to a clustering algorithm. Process 400 may be configured to execute the clustering algorithm to identify building group 422, detect plants 424, and obtain roofs 426 to properly segment the buildings 420 into individual building outlines. For example, process 400 may be configured to detect the rooftops using a plane detection algorithm and further segment instances of the buildings 420. Even further, process 400 may be configured to obtain roofs 426 using a Density-Based Spatial Clustering of Applications with Noise (DBSCAN) clustering algorithm.

Figure 5:
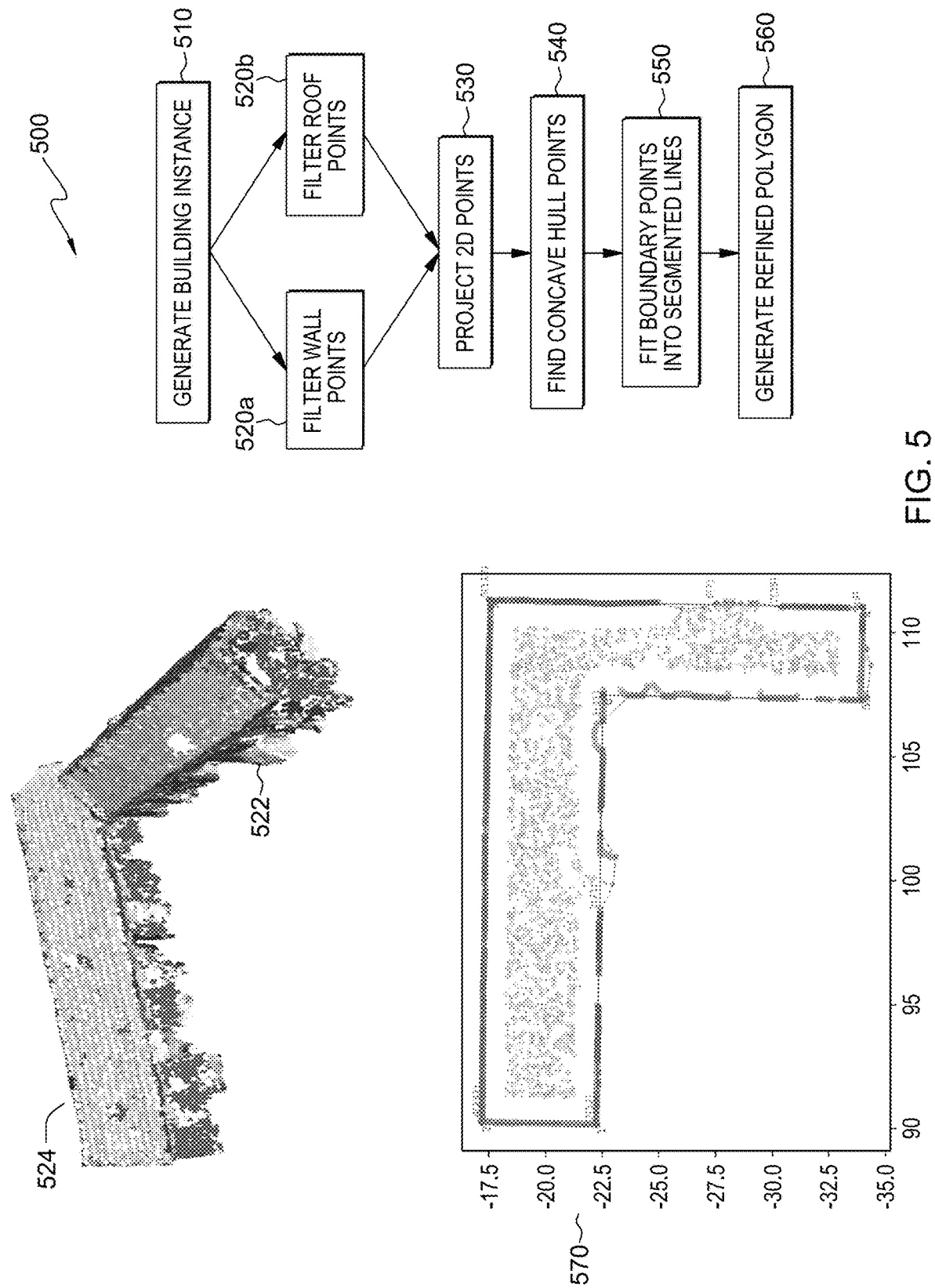
FIG. 5 depicts a block diagram of a building boundary generation process for generating a 2D building mapping, in accordance with an embodiment of the present invention.

FIG. 5 depicts a block diagram illustrating a building boundary generation process 500 (as performed by building boundary generation component 232) for generating a 2D building mapping, in accordance with an embodiment of the present invention.

In an embodiment, process 500 may include one or more processors configured to generate a building instance 510 corresponding to an identifiable outline of a building. Further, process 500 may include one or more processors configured to filter wall points 520a according to normal vectors and filter roof points 520b and down-sample the roof points. Further, process 500 may include one or more processors configured to project 2D points 530 from the 3D points, wherein the 3D points are denoised and only the x and y component of the 3D points are projected. Further, process 500 may include one or more processors configured to find concave hull points 540 using an alpha shape algorithm. Further, process 500 may include one or more processors configured to fit boundary points into segmented lines.

Figure 6:
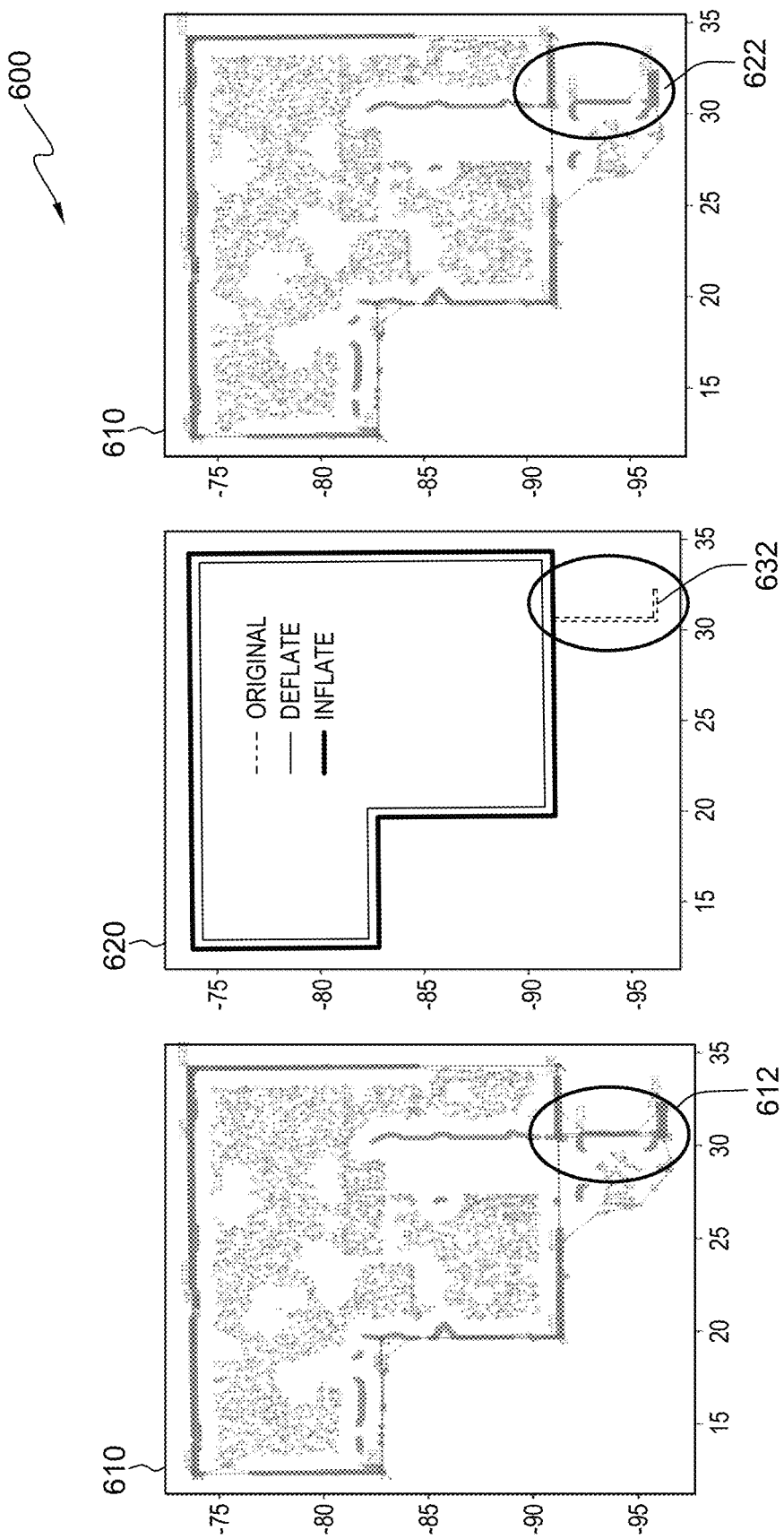
FIG. 6 depicts a block diagram of a boundary postprocessing process for generating a 2D building mapping, in accordance with an embodiment of the present invention.

FIG. 6 depicts a block diagram illustrating a boundary postprocessing process 600 (as performed by building boundary processing component 234) for generating a 2D building mapping, in accordance with an embodiment of the present invention.

In an embodiment, process 600 may include one or more processors configured to perform boundary postprocessing on the refined polygon (e.g., completed lines) as described above, herein. For example, process 600 may be configured to receive refined polygon image 610, deflate 612 the completed lines of the refined polygon image 610 to generate deflated completed lines of deflated polygon image 620, and inflate 632 the deflated completed lines, as described above herein. For example, process 600 may be configured to deflate the completed lines and inflate the deflated completed lines to generate building boundary data (e.g., model boundary output data) for further processing.

Figure 7:
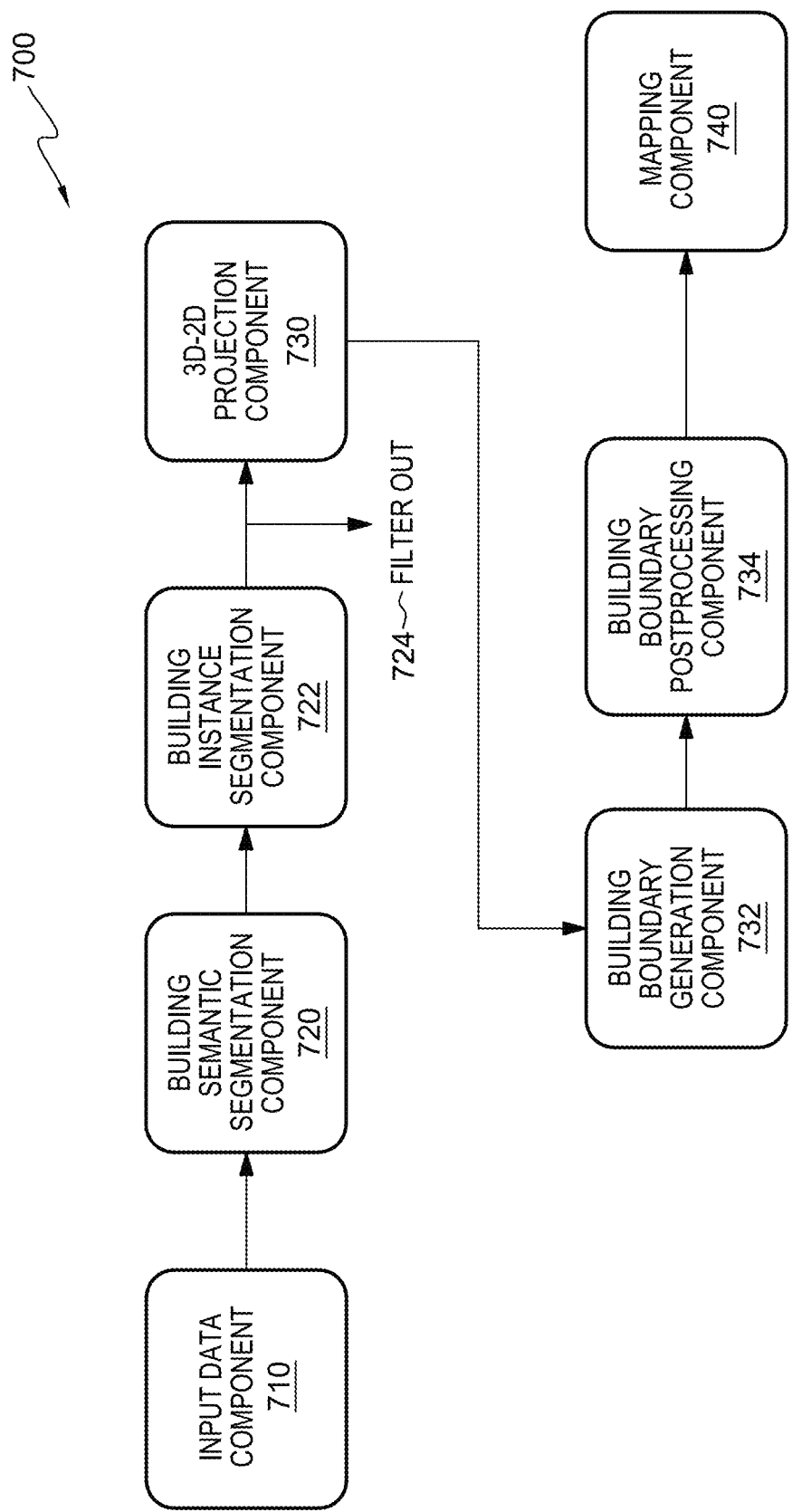
FIG. 7 depicts a block diagram of a point cloud system for generating a 2D building mapping, in accordance with an embodiment of the present invention.

FIG. 7 depicts a block diagram of a point cloud system model 700 for generating a 2D building mapping, in accordance with an embodiment of the present invention. Model 700 illustrates input data component 710 configured for receiving input data at particular stages, wherein the input data may include scanning data corresponding to 3D aerial LiDaR images.

In an embodiment, model 700 may include input data component 710 configured for receiving the scanning data, which may be in a first file format corresponding to the native file format used for 3D aerial LiDaR images (e.g., .LAS). In an embodiment, input data component 710 may be configured for transforming scanning data from a first file format to a second file format and transmitting the scanning data in the second file format to other components in model 700. In an embodiment, the second file format may be a file format corresponding to the appropriate use case for further processing by another component of model 700, or as known by one of ordinary skill in the art.

In an embodiment, prior to the transmitting the scanning data, input data component 710 may be configured for receiving the scanning data corresponding to the 3D LiDaR images, wherein the scanning data is in a first file format and transforming the scanning data from the first file format to the second file format.

In an embodiment, model 700 may include building segmentation component 720 configured to receive input data (e.g., scanning data) from input data component 710 in one or more of a plurality of file formats. Building segmentation component 720 may be configured to receive multiple input images and produce model segmentation output data (e.g., semantic segmentation data, instance segmentation data) as feature vectors corresponding to each image and transmit the model segmentation output data to another component of model 700 or to a series of fully connected layers. The output data from the fully connected layers may be representative of a classification for a full study. This model segmentation output data may be in the form of a confidence score or probability for each classification.

In an embodiment, model 700 may include building semantic segmentation component 722 configured to generate semantic segmentation data corresponding to one or more building structures defined by one or more point clusters.

In an embodiment, generating semantic segmentation data may further include building segmentation component 720 further configured to process the scanning data in the second file format using a deep learning (DL) model to generate building structure data configured to identify the one or more building structures based at least on the one or more point clusters.

In an embodiment, model 700 may include building instance segmentation component 722 configured to generate instance segmentation data corresponding to one or more top surfaces of the one or more building structures.

In an embodiment, generating instance segmentation data may further include building instance segmentation component 722 further configured to process one or more of the scanning data and the semantic segmentation data using a rooftop detection component to generate top surface data identifying the one or more top surfaces of the one or more building structures.

In an embodiment, model 700 may further be configured to identify one or more individual buildings based on the building structure data and the top surface data.

In an embodiment, model 700 may include one or more processors configured to filter out 724 one or more noise point clusters from the one or more point clusters, wherein the one or more noise point clusters are filtered out 724 if they satisfy a first condition. For example, if the one or more point clusters include less than 100 points, then the less than 100 point clusters may be filtered out 724 from being further processed within model 700 network. The condition to be satisfied to identify noise point clusters may be any value ascertainable or predetermined by a designer of model 700.

In an embodiment, model 700 may include 3D-2D projection component configured to project 2D points from the 3D points, wherein the 3D points are denoised and only the x and y component of the 3D points are projected.

In an embodiment, model 700 may include building boundary generation component 732 configured to receive model segmentation output data, and process model segmentation output data to filter out 724 wall points according to normal vectors, filter out 724 roof points and downsample roof points, denoise 3D points and keep only 2D information (e.g., x, y points). Further, building boundary generation component 732 configured to find concave hull points using alpha shape, fit boundary points into segmented lines using a RANSAC algorithm, and to merge, regularize, and complete the lines.

In an embodiment, building boundary generation component 732 may be configured to receive model segmentation output data (e.g., semantic segmentation data, instance segmentation data) and process the model segmentation output data to generate building boundary data for each one of the one or more point clusters based on one or more of the semantic segmentation data and the instance segmentation data.

In an embodiment, model 700 may include building boundary generation processing component 734 configured to deflate and inflate the completed lines as described above herein. For example, building boundary generation processing component 734 may be configured to receive data from building boundary generation component 732 corresponding to the completed lines and deflate the completed lines and inflate the deflated completed lines to generate building boundary data (e.g., model boundary output data) for further processing by another component (e.g., mapping component 740) in model 700.

In an embodiment, generating the building boundary data may further include one or more processors configured to discriminate wall data represented in the semantic segmentation data and roof data represented in the instance segmentation data.

In an embodiment, model 700 may include mapping component 740 configured to receive building boundary data and process the building boundary data to generate a 2D building mapping that may include refined boundary lines for each of the one or more point clusters. For example, mapping component 740 may be configured to separately project the wall data and the roof data into a 2D space of the 2D building mapping and generating a convex polygon based on the wall data and the roof data in the 2D space.

In an embodiment, model output data may be transmitted to computing device 120 via network 110 for processing and display on a user interface of computing device 120.

Figure 8:
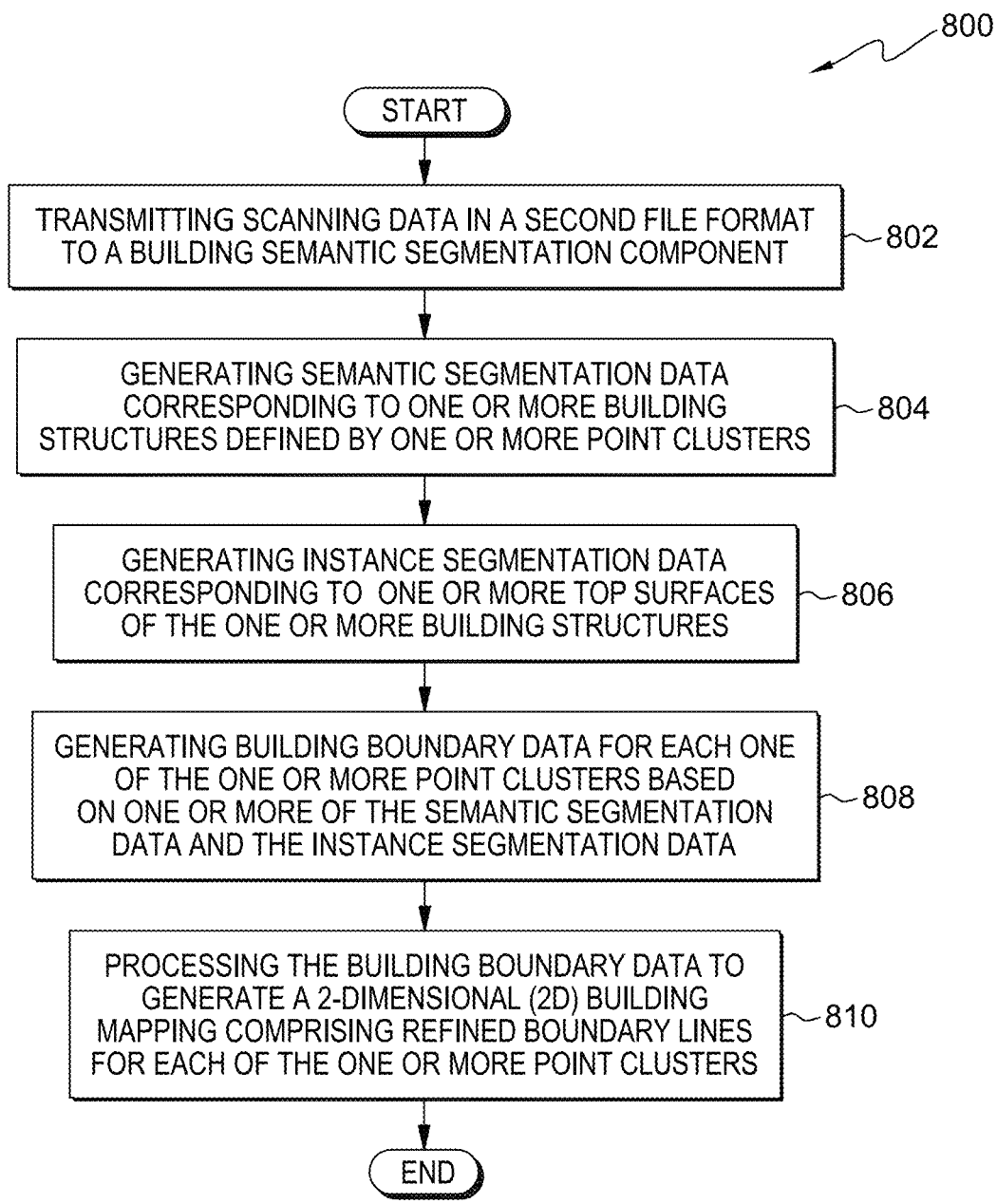
FIG. 8 depicts a flowchart of a computer-implemented method for generating a 2D building mapping, in accordance with an embodiment of the present invention.

FIG. 8 depicts a flow chart of a computer-implemented method 800 for generating a 2D building mapping, in accordance with an embodiment of the present invention.

In an embodiment, computer-implemented method 800 may include one or more processors configured for transmitting 802 scanning data in a second file format to a building semantic segmentation component.

In an embodiment, computer-implemented method 800 may include one or more processors configured for, prior to the transmitting the scanning data, receiving the scanning data corresponding to 3-dimensional (3D) aerial Light Detection and Ranging (LiDaR) images, wherein the scanning data is in a first file format. Further, method 800 may include one or processors configured for transforming the scanning data from the first file format to the second file format.

In an embodiment, computer-implemented method 800 may include one or more processors configured for generating 804 semantic segmentation data corresponding to one or more building structures defined by one or more point clusters.

In an embodiment, generating semantic segmentation data may further include one or more processors configured for processing the scanning data in the second file format using a deep learning (DL) model to generate building structure data identifying the one or more building structures based at least on the one or more point clusters.

In an embodiment, computer-implemented method 800 may include one or more processors configured for identifying one or more individual buildings based on the building structure data and the top surface data.

In an embodiment, computer-implemented method 800 may include one or more processors configured for filtering one or more noise point clusters from the one or more point clusters, the one or more noise point clusters satisfying a first condition.

In an embodiment, computer-implemented method 800 may include one or more processors for generating 806 instance segmentation data corresponding to one or more top surfaces of the one or more building structures.

In an embodiment, generating instance segmentation data may further include one or more processors configured for processing one or more of the scanning data and the semantic segmentation data using a rooftop detection component to generate top surface data identifying the one or more top surfaces of the one or more building structures.

In an embodiment, computer-implemented method 800 may include one or more processors for generating 808 building boundary data for each one of the one or more point clusters based on one or more of the semantic segmentation data and the instance segmentation data.

In an embodiment, generating the building boundary data may further include one or more processors configured for discriminating wall data represented in the semantic segmentation data and roof data represented in the instance segmentation data, separately projecting the wall data and the roof data into a 2D space of the 2D building mapping, and generating a convex polygon based on the wall data and the roof data in the 2D space.

In an embodiment, computer-implemented method 800 may include one or more processors configured for processing 810 the building boundary data to generate a 2D building mapping comprising refined boundary lines for each of the one or more point clusters.

Figure 9:
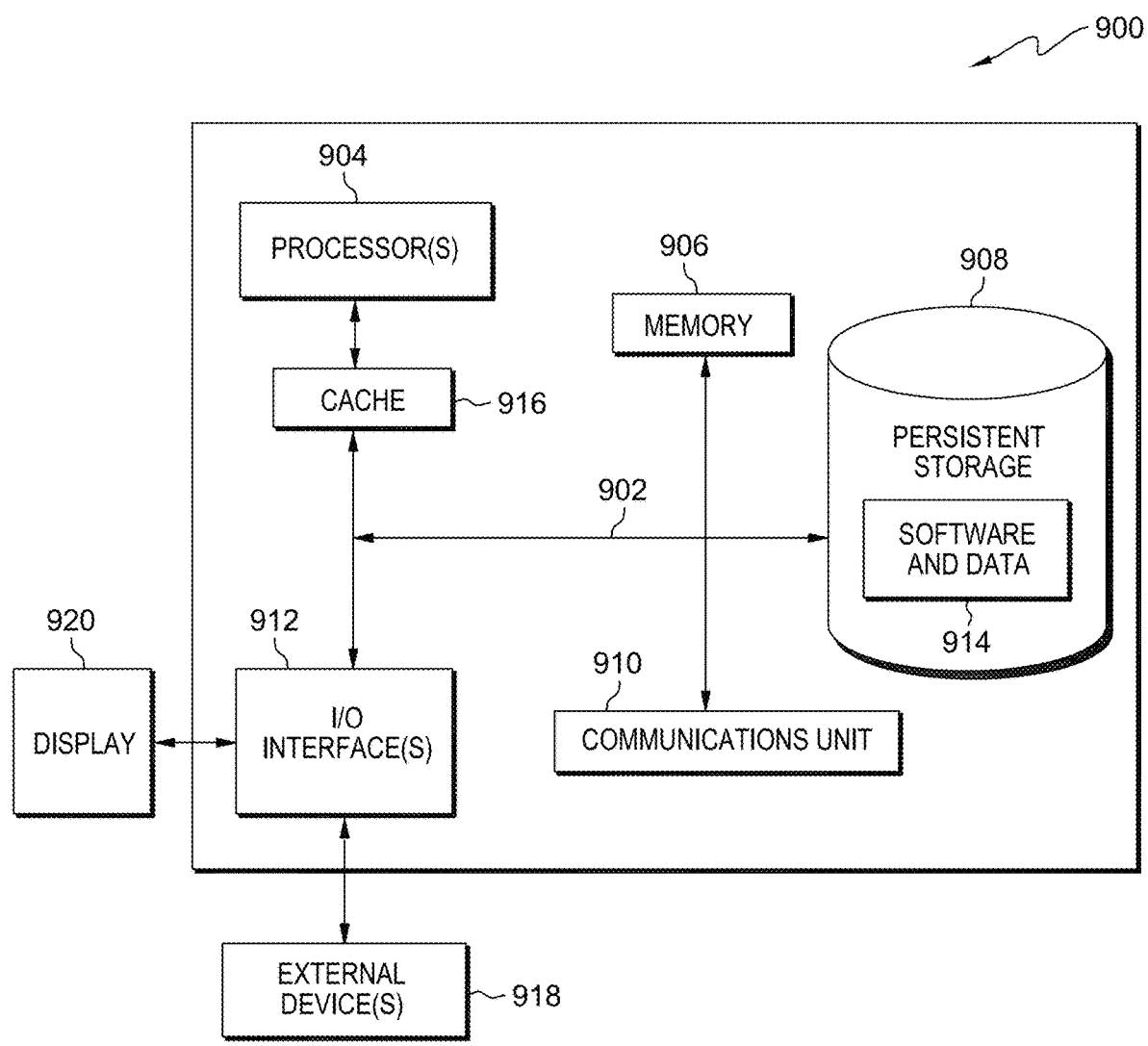
FIG. 9 depicts a block diagram of a computing device of the system of FIG. 1, in accordance with an embodiment of the present invention.

FIG. 9 depicts a block diagram of a computing device 900, suitable for computing device 120 of environment 100 of FIG. 1, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Computing device 900 includes communications fabric 902, which provides communications between cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of computer processor(s) 904 by holding recently accessed data, and data near accessed data, from memory 906.

Programs may be stored in persistent storage 908 and in memory 906 for execution and/or access by one or more of the respective computer processors 904 via cache 916. In an embodiment, persistent storage 908 includes a magnetic hard disk drive. Alternatively, or in addition to a magnetic hard disk drive, persistent storage 908 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transmit onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Programs, as described herein, may be downloaded to persistent storage 908 through communications unit 910.

I/O interface(s) 912 allows for input and output of data with other devices that may be connected to computing device 900. For example, I/O interface 912 may provide a connection to external devices 918 such as image sensor, a keyboard, a keypad, a touch screen, and/or some other suitable input device. External devices 918 can also include portable computer readable storage media such as, for example, thumb drives, portable optical or magnetic disks, and memory cards. Software and data 914 used to practice embodiments of the present invention can be stored on such portable computer readable storage media and can be loaded onto persistent storage 908 via I/O interface(s) 912. I/O interface(s) 912 also connect to a display 920.

Display 920 provides a mechanism to display data to a user and may be, for example, a computer monitor.

Software and data 914 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating a 2-dimensional (2D) building mapping, comprising:
    identifying, by one or more processors, scanning data in a second file format;
    generating, by the one or more processors, semantic segmentation data corresponding to one or more building structures defined by one or more point clusters;
    generating, by the one or more processors, instance segmentation data corresponding to one or more top surfaces of the one or more building structures;
    filtering, by the one or more processors, one or more noise point clusters from the one or more point clusters, the one or more noise point clusters satisfying a first condition;
    generating, by the one or more processors, building boundary data for each one of the one or more point clusters by identifying concave hull points using alpha shape, fitting boundary points into segmented lines using a random sample consensus (RANSAC) algorithm, processing the semantic segmentation data to filter out wall points according to normal vectors, filter out and down-sample roof points, denoise 3D points to keep only 2D information, and processing the instance segmentation data; and
    processing, by the one or more processors, the building boundary data to generate a 2D building mapping comprising refined boundary lines for each of the one or more point clusters.

2. The computer-implemented method of claim 1, further comprising:
    receiving, by the one or more processors, scanning data corresponding to 3-dimensional (3D) aerial Light Detection and Ranging (LiDaR) images, wherein the scanning data is in a first file format; and
    transforming, by the one or more processors, the scanning data from the first file format to the second file format.

3. The computer-implemented method of claim 1, wherein generating the semantic segmentation data further comprises:
    processing, by the one or more processors, the scanning data in the second file format using a deep learning (DL) model to generate building structure data identifying the one or more building structures based at least on the one or more point clusters.

4. The computer-implemented method of claim 3, wherein generating the instance segmentation data further comprises:
processing, by the one or more processors, one or more of the scanning data and the semantic segmentation data to generate top surface data identifying the one or more top surfaces of the one or more building structures.

5. The computer-implemented method of claim 4, further comprising:
identifying, by the one or more processors, one or more individual buildings based on the building structure data and the top surface data.

6. The computer-implemented method of claim 1, wherein generating the building boundary data further comprises:
discriminating, by the one or more processors, wall data represented in the semantic segmentation data and roof data represented in the instance segmentation data;
separately projecting, by the one or more processors, the wall data and the roof data into a 2D space of the 2D building mapping; and
generating, by the one or more processors, a convex polygon based on the wall data and the roof data in the 2D space.

7. A computer program product for generating a 2D building mapping, the computer program product comprising:
one or more computer readable storage media and program instructions stored on the one or more computer readable storage media, the program instructions comprising:
program instructions to identify scanning data in a second file format;
program instructions to generate semantic segmentation data corresponding to one or more building structures defined by one or more point clusters;
program instructions to generate instance segmentation data corresponding to one or more top surfaces of the one or more building structures;
program instructions to filter one or more noise point clusters from the one or more point clusters, the one or more noise point clusters satisfying a first condition;
program instructions to generate building boundary data for each one of the one or more point clusters by processing the semantic segmentation data to filter out wall points according to normal vectors, filter out and down-sample roof points, denoise 3D points to keep only 2D information, and processing the instance segmentation data; and
program instructions to process the building boundary data to generate a 2D building mapping comprising refined boundary lines for each of the one or more point clusters.

8. The computer program product of claim 7, further comprising:
program instructions to receive the scanning data corresponding to 3D aerial Light Detection and Ranging (LiDaR) images, wherein the scanning data is in a first file format; and
program instructions to transform the scanning data from the first file format to the second file format.

9. The computer program product of claim 7, wherein the program instructions to generate the semantic segmentation data further comprise:
program instructions to process the scanning data in the second file format using a DL model to generate building structure data identifying the one or more building structures based at least on the one or more point clusters.

10. The computer program product of claim 9, wherein the program instructions to generate the instance segmentation data further comprise:
program instructions to process one or more of the scanning data and the semantic segmentation data to generate top surface data identifying the one or more top surfaces of the one or more building structures.

11. The computer program product of claim 10, further comprising:
program instructions to identify one or more individual buildings based on the building structure data and the top surface data.

12. The computer program product of claim 7, wherein the program instructions to generate the building boundary data further comprise:
program instructions to discriminate wall data represented in the semantic segmentation data and roof data represented in the instance segmentation data;
program instructions to separately project the wall data and the roof data into a 2D space of the 2D building mapping; and
program instructions to generate a convex polygon based on the wall data and the roof data in the 2D space.

13. A computer system for generating a 2D building mapping, the computer system comprising:
one or more computer processors;
one or more computer readable storage media;
program instructions stored on the one or more computer readable storage media for execution by at least one of the one or more processors, the program instructions comprising:
program instructions to identify scanning data in a second file format;
program instructions to generate semantic segmentation data corresponding to one or more building structures defined by one or more point clusters;
program instructions to generate instance segmentation data corresponding to one or more top surfaces of the one or more building structures;
program instructions to filter one or more noise point clusters from the one or more point clusters, the one or more noise point clusters satisfying a first condition;
program instructions to generate building boundary data for each one of the one or more point clusters by processing the semantic segmentation data to filter out wall points according to normal vectors, filter out and down-sample roof points, denoise 3D points to keep only 2D information, and processing the instance segmentation data; and
program instructions to process the building boundary data to generate a 2D building mapping comprising refined boundary lines for each of the one or more point clusters.

14. The computer system of claim 13, further comprising:
program instructions to receive the scanning data corresponding to 3D aerial Light Detection and Ranging (LiDaR) images, wherein the scanning data is in a first file format; and
program instructions to transform the scanning data from the first file format to the second file format.

15. The computer system of claim 13, wherein the program instructions to generate the semantic segmentation data further comprise:
- program instructions to process the scanning data in the second file format using a DL model to generate building structure data identifying the one or more building structures based at least on the one or more point clusters.

16. The computer system of claim 15, wherein the program instructions to generate the instance segmentation data further comprise:
- program instructions to process one or more of the scanning data and the semantic segmentation data to generate top surface data identifying the one or more top surfaces of the one or more building structures; and
- program instructions to identify one or more individual buildings based on the building structure data and the top surface data.

17. The computer system of claim 13, wherein the program instructions to generate the building boundary data further comprise:
- program instructions to discriminate wall data represented in the semantic segmentation data and roof data represented in the instance segmentation data;
- program instructions to separately project the wall data and the roof data into a 2D space of the 2D building mapping; and
- program instructions to generate a convex polygon based on the wall data and the roof data in the 2D space.

* * * * *